(12) United States Patent
Krotzer

(10) Patent No.: US 8,550,509 B1
(45) Date of Patent: Oct. 8, 2013

(54) METHODS AND APPARATUS TO SECURE A WINDOW

(76) Inventor: James Eric Krotzer, Kyle, TX (US)

( * ) Notice: Subject to any disclaimer, the term of this patent is extended or adjusted under 35 U.S.C. 154(b) by 248 days.

(21) Appl. No.: 12/896,764

(22) Filed: Oct. 1, 2010

(51) Int. Cl.
*E05C 17/44* (2006.01)
*E05F 5/02* (2006.01)

(52) U.S. Cl.
USPC ............... 292/342; 292/343; 292/DIG. 20; 16/82

(58) Field of Classification Search
USPC ............ 292/342, 343, DIG. 20; 49/348, 372, 49/377; 428/156; 16/82
See application file for complete search history.

(56) References Cited

U.S. PATENT DOCUMENTS

| | | | | |
|---|---|---|---|---|
| 33,596 | A | * | 10/1861 | Morrison ............... 292/230 |
| 372,827 | A | * | 11/1887 | Stopper ............... 292/241 |
| D29,287 | S | * | 8/1898 | Taliaferro ............... D8/402 |
| 1,035,005 | A | * | 8/1912 | Harris ............... 292/67 |
| 1,385,208 | A | * | 7/1921 | Geddes ............... 16/404 |
| 1,465,302 | A | * | 8/1923 | Haskel ............... 292/343 |
| 1,589,231 | A | | 6/1926 | Rumbold |
| 1,970,879 | A | * | 8/1934 | Bell ............... 292/343 |
| 105,350 | A | | 6/1937 | Smull |
| D105,350 | S | * | 7/1937 | Smull ............... D8/402 |
| 2,143,266 | A | | 1/1939 | Grondahl |
| 3,788,006 | A | | 1/1974 | Teggelaar |
| 4,501,444 | A | | 2/1985 | Dominguez |
| 4,552,395 | A | | 11/1985 | Dominguez |
| 4,573,721 | A | * | 3/1986 | Orchard et al. ............... 292/145 |
| 4,736,974 | A | | 4/1988 | Rosenthal |
| 5,054,250 | A | | 10/1991 | Foss |
| D331,696 | S | | 12/1992 | Graham |
| 5,340,176 | A | | 8/1994 | Cresci |
| 5,552,768 | A | | 9/1996 | Mikiel |
| 6,018,916 | A | | 2/2000 | Henry |
| 6,364,289 | B1 | | 4/2002 | Cook |
| 6,551,690 | B2 | | 4/2003 | Dwinell |
| 7,644,964 | B2 | * | 1/2010 | Bushey et al. ............... 292/342 |

* cited by examiner

*Primary Examiner* — Carlos Lugo
(74) *Attorney, Agent, or Firm* — Christopher & Weisberg, P.A.

(57) ABSTRACT

Methods and apparatus include a hand-insertable window wedging mechanism. When positioned in an interior corner of an automobile door frame, the wedge keeps the window of the door from sliding down, and may secure the window in a fully closed position.

16 Claims, 4 Drawing Sheets

METHODS AND APPARATUS TO SECURE A WINDOW

FIELD

This written description is in the field of windows, and in particular the written description is in the field of window wedges.

BRIEF DESCRIPTION OF THE DRAWINGS

Advantages of embodiments will become apparent upon reading the following detailed description and upon reference to the accompanying drawings in which like references may indicate similar elements.

DETAILED DESCRIPTION OF EMBODIMENTS

The following is a detailed description of example embodiments depicted in the accompanying drawings. The example embodiments are in such detail as to clearly communicate various embodiments. However, the amount of detail offered is not intended to limit the anticipated variations of embodiments; but, on the contrary, the intention is to cover all modifications, equivalents, and alternatives falling within the scope of the appended claims. The detailed description below is designed to render various embodiments obvious to a person of ordinary skill in the art.

Methods and apparatus to wedge a car window are disclosed. One embodiment is a hand-insertable window wedging mechanism. When positioned in an interior corner of an automobile door frame, the wedge keeps the window of the door from sliding down, and may secure the window in a fully closed position.

In many automobiles, the windows of the automobile are motor driven so that a window may be moved up or down by depressing a button. Unfortunately, the automatic mechanism for raising and lowering the window sometimes breaks and may be expensive to repair. Because of the expense, many automobile owners may decide to postpone the repair to delay incurring the expense of repair. However, when the mechanism for raising and lowering the window breaks, the window may slide down into a partially open position, allowing rain in and allowing cooled or heated air out. What is desired is a mechanism for wedging the window into a fully closed position.

Figure 1:
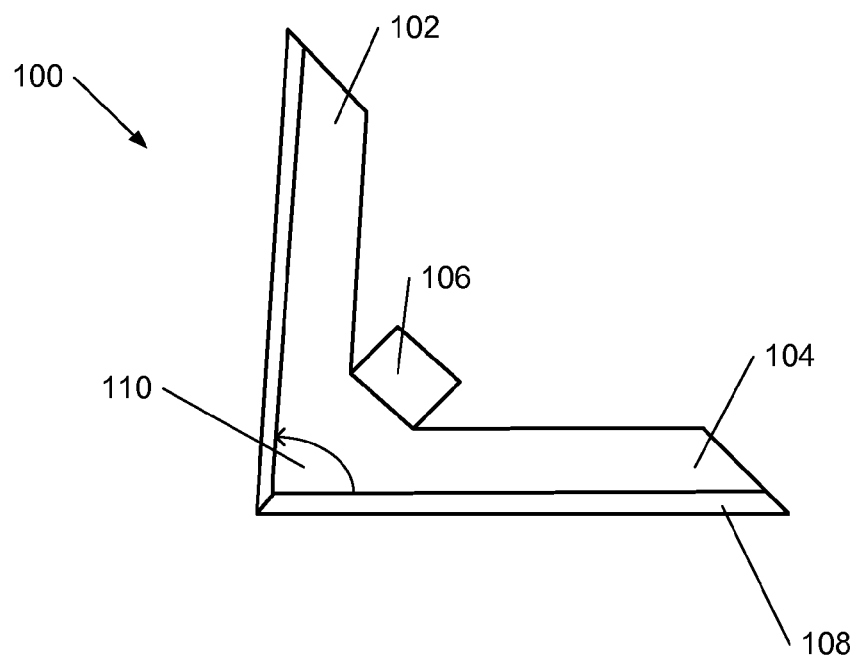
FIG. 1 is a drawing of a window wedge device constructed in accordance with principles described herein.

FIG. 1 is a drawing of a window wedge device constructed in accordance with principles described herein and labeled device 100. In one embodiment, the wedge includes a first wing 102 and a second wing 104. The angle 110 between the first and second wings may vary to fit an angle of an interior corner of a door frame. For example, in some embodiments the angle 110 is greater than 80 degrees. In some embodiments the angle 110 is substantially 90 degrees. The wedge device 100 includes a grasping mechanism 106 extending outwardly from the region where the first wing 102 and the second wing 104 merge.

Figure 2:
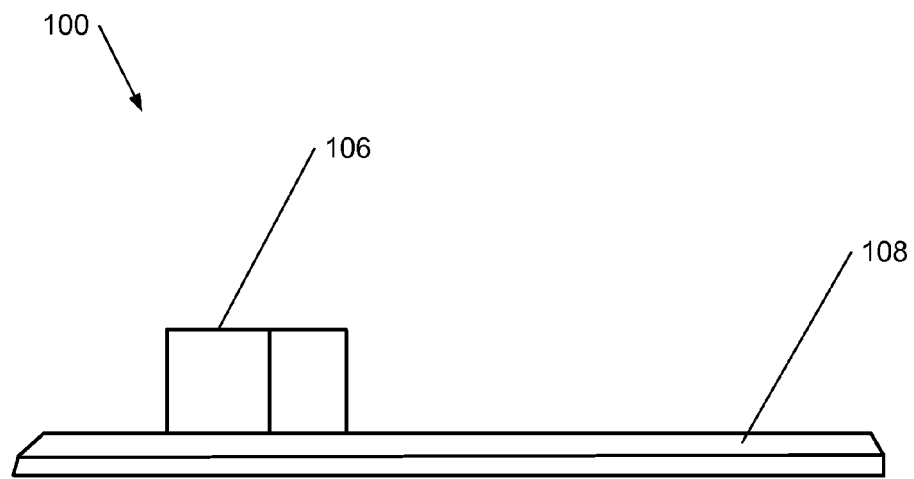
FIG. 2 is a drawing of an edge view of the window wedge of FIG. 1.
Figure 3:
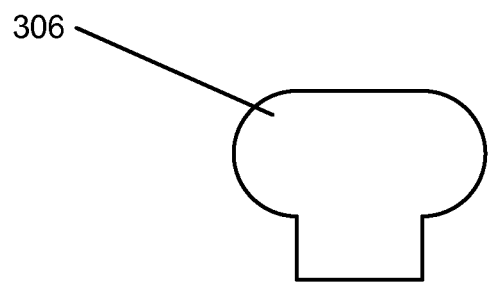
FIG. 3 is a drawing of an end view of a grasping mechanism for grasping a window wedge device as described herein.

FIG. 2 is a drawing of an edge view of the window wedge device 100 of FIG. 1. The window wedge has a grasping mechanism 106 having a rectangular cross section and extends upward from the plane of the wings. An edge 108 of the wings is beveled at an angle to ease the process of inserting the wedge into position. FIG. 3 shows an end view of an alternative embodiment of a grasping mechanism 306 that may be attached to the wedge device in the position of the grasping mechanism 106 of FIG. 1. The grasping mechanism 306 has a shape to facilitate firm grasping of the mechanism by a human hand.

Figure 4:
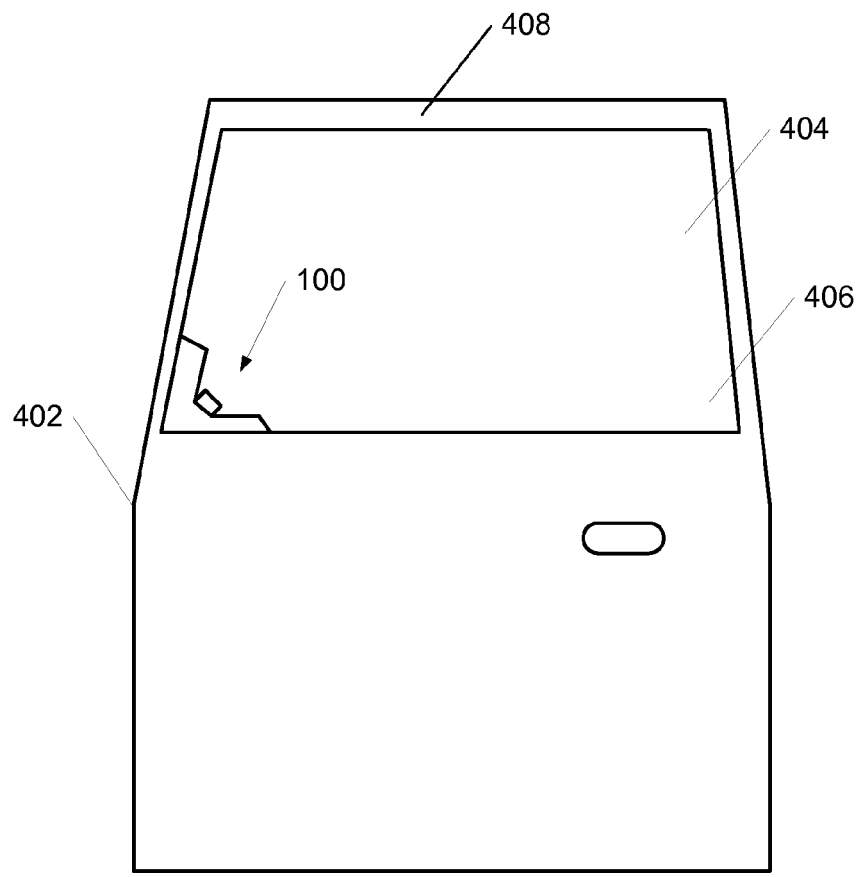
FIG. 4 is a drawing of a car door and window and the window wedge in a position to wedge the window securely into a fully closed position.

FIG. 4 shows an automobile door 402 with a window 404. In a corner of the door frame 408 that surrounds the window 404 is a window wedge device 100, such as the window wedge device 100 of FIG. 1. The window wedge 100 could also be placed in an opposite corner 406 of the door frame 408.

In one embodiment, the window wedge can be made of a suitable material that is preferably pliable. Materials that can be used include polyurethane, rubber, plastic, foam, vinyl, wood, neoprene, nitrile, felts, silicon, fiberglass, nylon, cardboard, paper, Teflon, viton, polymers, synthetic fibers and carbon fibers, or any combination or compound thereof. The window wedge can be cut from a sheet of one of these materials. A grasping mechanism may be adhered to the device using an adhesive. The grasping mechanism may be made of a material that the wedge body is made of, or may be made of a different material. Suitable dimensions may vary. For example, in one embodiment a wing 102 or 104 may be about 4 inches long. The thickness of the wings of the device may be about ¼ inch. A width of a wing may be about 1 inch.

Thus, one embodiment is a hand-removable and hand-insertable window wedging mechanism that, when positioned in a corner of an automobile door frame to wedge a window of the door, keeps the window from sliding down. The window wedging mechanism includes a pliable material having a substantially vertical element removably insertable between the window and a vertical part of the door frame, and having a substantially horizontal element removably insertable between the window and a horizontal part of the door frame. The window wedging mechanism has a tab positioned at an angle between the substantially vertical element and the substantially horizontal element, the tab to enable removal of the wedging mechanism by hand. The mechanism may have a grasping mechanism that is adhered to the tab. The grasping mechanism may be shaped to provide a handle for grasping, such as the shape shown in FIG. 3. In some embodiments, the substantially vertical element and the substantially horizontal element are beveled along an edge that inserts between the door frame and the window. The substantially vertical element and the substantially horizontal element may be substantially flat except along the beveled edges. The mechanism may be cut from a sheet of pliable material.

Another embodiment is a window wedge for wedging an automobile window into a fixed position. The window wedge inserts into a corner of a door frame of the automobile window. The window wedge includes a first wing that exhibits a substantially flat surface and that aligns substantially parallel to a first portion of the door frame forming the corner. The window wedge also includes a second wing that exhibits a substantially flat surface and that extends from the first wing at an angle and that aligns substantially parallel to a second portion of the door frame forming the corner. The first and second wings may exhibit edges that form an angle with the substantially flat surfaces of the first and second wings. The window wedge may be cut from a sheet of material that is about ¼ inch thick, plus or minus 1/16 of an inch. The window wedge may further comprise a tab to enable grasping of the window wedge for each of insertion and removal. The tab may further include a grasping mechanism attached to the tab. In one embodiment, the angle between the first wing and the second wing is about the same as an angle between the first portion of the door frame and the second portion of the door frame. This angle may be greater than 80 degrees in some embodiments.

Another embodiment is a window wedge for wedging an automobile window in a fixed position. The window wedge includes a substantially flat material that exhibits a corner to mate with a corner of a door frame holding the window. The window wedge may further comprise a tab to enable grasping the window wedge. The window wedge may exhibit an edge that is at an angle with respect to a surface of the substantially flat material. The corner may be formed by a first extending part and a second extending part at an angle to the first extending part. The substantially flat material may be formed of a plastic compound and/or may be a pliable material.

Although the present embodiments and some of its advantages have been described in detail, it should be understood that various changes, substitutions and alterations can be made herein without departing from the scope of the appended claims. Although an embodiment may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present embodiments, processes, machines, manufacture, compositions of matter, means, methods, or steps, presently existing or later to be developed that perform substantially the same function or achieve substantially the same result as the corresponding embodiments described herein may fall within the scope of the appended claims. Accordingly, the appended claims are intended to include within their scope such processes, machines, manufacture, compositions of matter, means, methods, or steps.

What is claimed is:

1. A hand-removable and hand-insertable window wedging mechanism that, when positioned in a corner of an automobile door frame to wedge a window of the door, keeps the window from sliding down, the window wedging mechanism comprising a pliable material having a substantially vertical element having a first beveled edge along an entire length, from a free end to a vertex, of the substantially vertical element and removably insertable along the entire length between the window and a vertical part of the door frame so that the entire length of the first beveled edge of the vertical element is entirely wedged between the window and the vertical part of the door frame to increase a wedging effect, having a substantially horizontal element having a second beveled edge along an entire length, from a free end to the vertex, of the substantially horizontal element and removably insertable along the entire length between the window and a horizontal part of the door frame so that the entire length of the second beveled edge of the horizontal element is entirely wedged between the window and the horizontal part of the door frame, simultaneously with the entire length of the vertical element being inserted between the window and the door frame, to increase the wedging effect, and having a tab positioned at an angle between the substantially vertical element and the substantially horizontal element, the tab to enable removal of the wedging mechanism manually.

2. The window wedging mechanism of claim 1, wherein a grasping mechanism is adhered to the tab.

3. The window wedging mechanism of claim 2, wherein the grasping mechanism is shaped to provide a handle to be manually grasped.

4. The window wedging mechanism of claim 1, wherein the substantially vertical element and the substantially horizontal element are substantially flat except along the beveled edges.

5. A window wedge for wedging an automobile window into a fixed position, the window wedge inserting into a corner of a door frame of the automobile window, the window wedge comprising:
a first wing that exhibits a substantially flat surface with a first beveled edge along an entire length of the first wing and that aligns substantially parallel to a first substantially vertical portion of the door frame forming the corner, the first wing having a length extending from a free end to a vertex, such that, when the window wedge is positioned to wedge the automobile window, the entire length of the first beveled edge of the first wing is inserted and entirely wedged between the window and the door frame to increase a wedging effect; and
a second wing that exhibits a substantially flat surface with a second beveled edge along an entire length of the second wing and that extends from the first wing at an angle and that aligns substantially parallel to a second substantially horizontal portion of the door frame forming the corner, the second wing having a length extending from a free end to the vertex, such that, when the window wedge is positioned to wedge the automobile window, the entire length of the of the second beveled edge of the second wing is inserted and entirely wedged between the window and door frame, simultaneously with the entire length of the first wing being inserted between the window and the door frame, to increase the wedging effect.

6. The window wedge of claim 5, wherein the window wedge is cut from a sheet of material.

7. The window wedge of claim 6, wherein the sheet of material is about ¼ inch thick.

8. The window wedge of claim 5, further comprising a tab to enable grasping of the window wedge.

9. The window wedge of claim 8, further comprising a grasping mechanism attached to the tab.

10. The window wedge of claim 8, wherein the angle is greater than 80 degrees.

11. The window wedge of claim 5, wherein the angle between the first wing and the second wing is about the same as an angle between the first portion of the door frame and the second portion of the door frame.

12. A window wedge for wedging an automobile window in a fixed position, the window wedge comprising a substantially flat material that exhibits a corner having a substantially vertical wing with a first beveled edge along an entire length of the substantially vertical wing, the substantially vertical wing extending from a free end to a vertex, and a substantially horizontal wing with a second beveled edge along an entire length of the substantially horizontal wing, the substantially horizontal wing extending from a free end to the vertex, to mate with a corner of a door frame holding the window, the substantially vertical and horizontal wings each having a length of about 4 inches and positioned with respect to each other such that when the wedge is inserted between the window and a door frame of the automobile in a corner of the door frame, the entire beveled lengths of the substantially vertical and horizontal wings are inserted and entirely wedged between the window and the door frame, simultaneously.

13. The window wedge of claim 12, further comprising a tab to enable grasping the window wedge.

14. The window wedge of claim 12, wherein the corner is formed by a first extending part and a second extending part at an angle to the first extending part.

15. The window wedge of claim 12, wherein the substantially flat material is a plastic compound.

16. The window wedge of claim 12, where the substantially flat material is pliable.

\* \* \* \* \*